(12) United States Patent
Ammedick et al.

(10) Patent No.: US 11,163,377 B2
(45) Date of Patent: Nov. 2, 2021

(54) REMOTE GENERATION OF EXECUTABLE CODE FOR A CLIENT APPLICATION BASED ON NATURAL LANGUAGE COMMANDS CAPTURED AT A CLIENT DEVICE

(71) Applicant: Adobe Inc., San Jose, CA (US)

(72) Inventors: Soeren Ammedick, Hamburg (DE); Christopher Chirogene, Hamburg (DE)

(73) Assignee: Adobe Inc., San Jose, CA (US)

( * ) Notice: Subject to any disclaimer, the term of this patent is extended or adjusted under 35 U.S.C. 154(b) by 167 days.

(21) Appl. No.: 15/928,613

(22) Filed: Mar. 22, 2018

(65) Prior Publication Data

US 2019/0295532 A1    Sep. 26, 2019

(51) Int. Cl.
| | |
|---|---|
| *G06F 3/023* | (2006.01) |
| *G10L 15/18* | (2013.01) |
| *G10L 15/22* | (2006.01) |
| *G10L 15/30* | (2013.01) |
| *G06F 40/20* | (2020.01) |

(52) U.S. Cl.
CPC .............. *G06F 3/023* (2013.01); *G06F 40/20* (2020.01); *G10L 15/1815* (2013.01); *G10L 15/22* (2013.01); *G10L 15/30* (2013.01); *G10L 2015/223* (2013.01)

(58) Field of Classification Search
CPC ..... G10L 15/1815; G10L 15/22; G10L 15/30; G10L 2015/223

USPC ......................................................... 704/235
See application file for complete search history.

(56) References Cited

U.S. PATENT DOCUMENTS

| | | | | |
|---|---|---|---|---|
| 8,949,781 | B1 * | 2/2015 | Orcutt | G06F 8/20 717/109 |
| 2003/0216923 | A1 * | 11/2003 | Gilmore | G10L 13/027 704/270.1 |
| 2011/0060587 | A1 * | 3/2011 | Phillips | G10L 15/30 704/235 |
| 2015/0309813 | A1 * | 10/2015 | Patel | G06F 11/3664 703/22 |
| 2016/0217790 | A1 * | 7/2016 | Sharifi | G10L 15/01 |

\* cited by examiner

*Primary Examiner* — Michael Colucci
(74) *Attorney, Agent, or Firm* — FIG. 1 Patents

(57) ABSTRACT

Remote generation of executable code for a client application based on natural language commands captured at a client device are described. A natural language command is received at a client device, and natural language data is generated and communicated to a remote service provider system. The service provider system processes the natural language data using natural language processing techniques to recognize one or more actions of the natural language command, and generates executable code to perform the one or more actions of the natural language command by the client application. The executable code is then communicated back to the client device over a network to cause the client application to blindly execute the executable code to perform the one or more actions of the natural language command.

20 Claims, 11 Drawing Sheets

REMOTE GENERATION OF EXECUTABLE CODE FOR A CLIENT APPLICATION BASED ON NATURAL LANGUAGE COMMANDS CAPTURED AT A CLIENT DEVICE

BACKGROUND

Like computing technologies generally, the development of user interfaces continues to evolve. There has been much work, for example, developing "natural user interfaces" (NUIs). Broadly speaking, NUIs are systems that enable user-computer interactions through intuitive natural language commands related to natural, everyday human behavior. Some examples of NUIs include text-based interfaces that allow users to input a text-based command, voice user interfaces that allow users to interact with a system through spoken commands, touch interfaces that let users interact with controls and applications more intuitively than cursor based interfaces because the touch interfaces are more direct, gesture recognition systems that track motions of users and translate those motions into instructions, and gaze-tracking interfaces that allow users to guide a system through eye movements.

Conventional systems and technique either execute natural language commands directly on a remote server, or a client application executes built-in commands which are recognized by a natural language processor of the client device. However, in order to support new functionality or update existing natural language functionality, conventional systems and techniques must update the client application to recognize new and execute new natural language commands.

SUMMARY

To overcome these problems, remote generation of executable code for a client application based on natural language commands captured at a client device are described. In one or more implementations, a natural language user interface is displayed by a natural language module of a client device. The natural language module receives user input comprising a natural language command for a client application, and generates natural language data based on the natural language command. In some cases, the natural language interface includes a text-input control and the natural language data includes raw textual data comprising text entered into the text-input control of the natural language interface. Alternately or additionally, the natural language interface includes a voice-input control and the natural language data comprises raw voice data captured by one or more microphones of the computing device in response to a user selection of the voice-input control of the natural language user interface. The natural language data is then communicated from the client device to a service provider system over a network. The client device then receives executable code generated at the service provider system to perform one or more actions of the natural language command, and blindly executes the executable code to perform the one or more actions for the client application.

In one or more implementations, a service provider system receives natural language data corresponding to a natural language command collected at a client device for a client application. The service provider then processes the natural language data using natural language processing techniques to recognize one or more actions of the natural language command. In some cases, the natural language data includes textual data comprising raw text collected at the client device, and the service provider system processes the textual data using the natural language processing techniques to recognize the one or more actions of the natural language command. Alternately or additionally, the natural language data may include voice data comprising raw voice data collected at the client device via one or more microphones of the client device. In this scenario, the service provider system converts the voice data into recognized textual data using a voice recognition system, and then processes the recognized textual data using the natural language processing techniques to recognize the one or more actions of the natural language command. After the one or more actions are identified, the service provider system generates executable code to perform the one or more actions of the natural language command by the client application, and communicates the executable code to the client device over a network to cause the client application to blindly execute the executable code to perform the one or more actions of the natural language command.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures.

DETAILED DESCRIPTION

Overview

Figure 1:
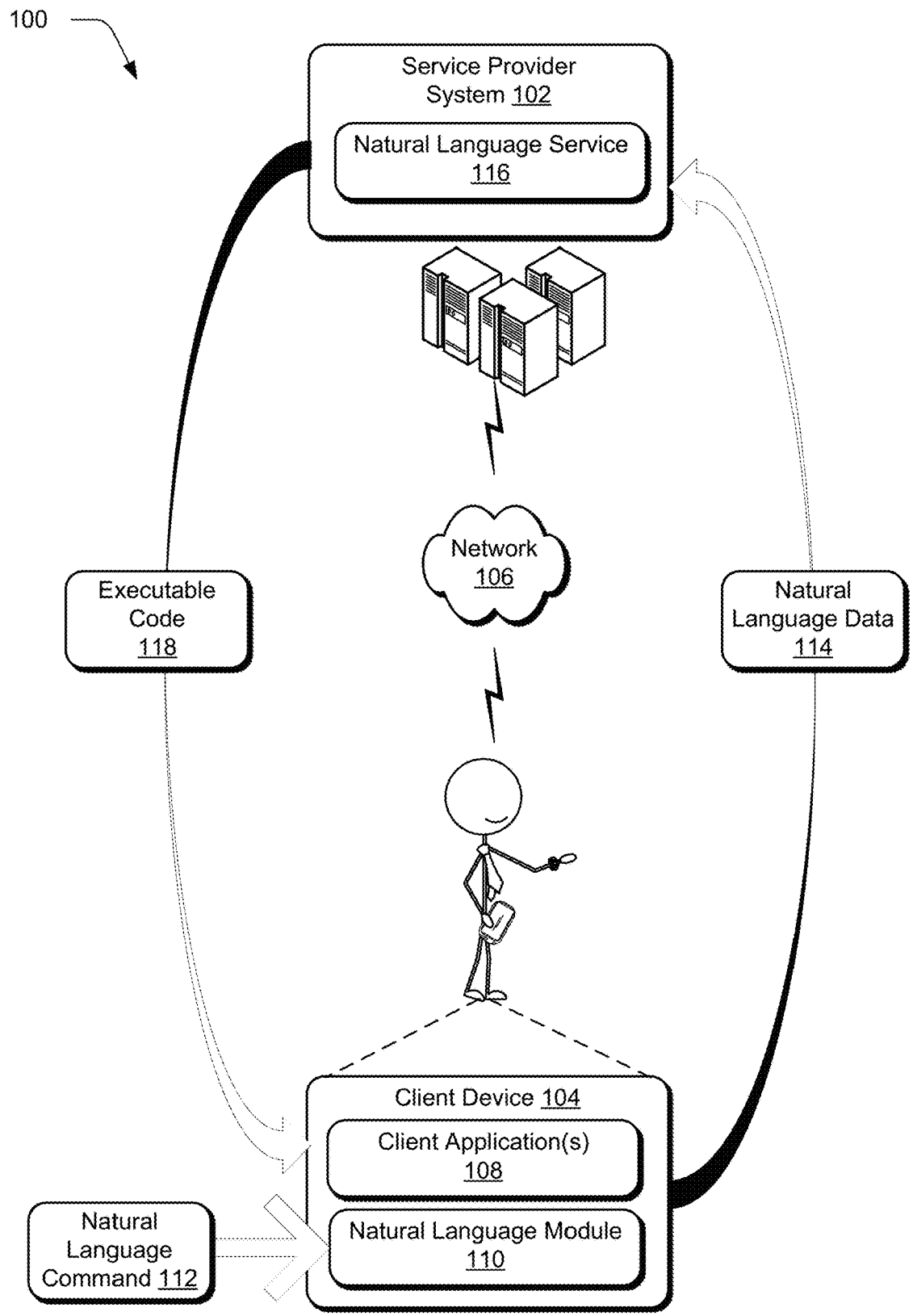
FIG. 1 is an illustration of an environment 100 in an example implementation that is operable to employ remote generation of executable code for a client application based on natural language commands captured at a client device described herein.

Techniques for remote generation of executable code for a client application based on natural language commands captured at a client device are described. In one or more implementations, a natural language module is configured to interface with a client application and collect natural language commands for the client application. The natural language module can be configured to recognize a variety of different natural language commands, such as text-based commands, voice based commands, gestures, and so forth. As an example, a user can provide a natural language command for a client application by entering text into a text-input control displayed by the natural language module, or by selecting a voice-input control of the natural language module and speaking the natural language command.

Rather than processing the natural language command locally at the client device to recognize the command and execute actions corresponding to the command, the client application generates natural language data corresponding to the collected natural language command and communicates the natural language data to a remote service provider system (e.g., one or more servers), over a network, for processing. The natural language data may include the unmodified raw data of the natural language command and a minimal amount of metadata associated with the client application (e.g., an identifier of the client application). Thus, the natural language data can be generated by the natural language module without processing the natural language command locally at the client device.

The service provider system receives the natural language data from the client device over the network. If the natural language data includes voice data, the service provider system utilizes a voice recognition system to first convert the speech to text. Then, a natural language processor of the service provider system processes either the converted text or the original text of the natural language command to identify one or more actions of the natural language command. The service provider system then generates executable code to perform the one or more identified actions of the natural language command.

The executable code is generated in a form that is understandable by the client application and is configured to be blindly executed by the client application. As described herein, "blindly executed" refers to execution of executable code or script without any additional processing locally at the client device. In other words, the executable code is executed by the client device without it being checked, parsed, or compiled by the client device. Notably, the executable code, such as a script or macro, is generated entirely on trusted servers of the service provider system remote from the client device. The service provider system communicates the executable code back to the client application.

The client application receives the executable code from the service provider system, and blindly executes the executable code to perform the identified actions of the natural language command. In other words, a script engine at the client device simply interprets and executes the executable code in order to perform the actions of the natural language command without any additional processing at the client device. Doing so results in hardware improvements for the client device by decreasing the amount of memory and processing resources consumed at the client device, as the processing is performed at the service provider remote from the client device. Notably, the service provider system provides a secure connection to the client device to ensure that the executable code is not compromised by a malicious actor.

Thus, the devices, techniques, and systems discussed herein provide a decoupled architecture in which voice to text conversion, natural language processing, and executable code generation is performed at a remote service provider system which is completely separate from the client device at which the client application is implemented. Doing so provides various advantages over conventional natural language processing systems. For instance, providing the natural language input processing and code generation in a completely decoupled and independent environment eliminates the need to modify or change the client application in order to add new functionality. In other words, there is no need to change the client app binary executable code when adding new or updated features (e.g., voice or text commands). Thus, new language commands of existing client functionality can be added to the client application without requiring the user to install updates for the client application. Doing so enables arbitrary existing features and functionality of the client application to be triggered by the new language commands. Additionally, processes of the service provider system can be improved without changing the client application. For example, the service provider system provides distinct modules such as a voice recognition system and a natural language processor, each of which can be improved or simply replaced without modifying the client application.

Additionally, the service provider system can access multiple different code vocabularies for different client applications, each of which includes a mapping between actions and executable code. Thus, the service provider system can generate executable code for multiple different types of applications. In order for a new application to add functionality of the service provider system, the client application simply provides the service provider system with access to the code vocabulary of the client application.

Example Environment

FIG. 1 is an illustration of an environment 100 in an example implementation that is operable to employ remote generation of executable code for a client application based on natural language commands captured at a client device described herein. The illustrated environment 100 includes a service provider system 102 and a client device 104 that are communicatively coupled, one to another, via a network 106.

Computing devices that are usable to implement the service provider system 102 and client device 104 may be configured in a variety of ways. A computing device, for instance, may be configured as a desktop computer, a laptop computer, a mobile device (e.g., assuming a handheld configuration such as a tablet or mobile phone as illustrated), and so forth. Thus, the computing device may range from full resource devices with substantial memory and processor resources (e.g., personal computers, game consoles) to a low-resource device with limited memory and/or processing resources (e.g., mobile devices). Additionally, a computing device may be representative of a plurality of different devices, such as multiple servers utilized by a business to perform operations "over the cloud" as further described in relation to FIG. 8.

Client device 104 is illustrated as including client applications 108, which may correspond to any type of application that is executable on client device 104. In some cases, applications 108 may correspond to content generation and/or editing applications, such as applications to generate and/or edit images, video, text, and so forth. Generally, applications 108 are configured to receive user input, and execute executable code (e.g., scripts) in order to perform an action identified by the user input.

Client device 104 is further illustrated as including a natural language module 110 that is representative of functionality to receive natural language commands 112 for an application 108. In some cases, natural language module 110 is implemented as an extension or plugin which includes application programming interfaces (API's) to interface with multiple different client applications 108. The natural language module 110 is configured to provide a user interface to receive the natural language commands 112. The natural language module can receive natural language commands 112 in a variety of different forms, including by way of example and not limitation, textual input, voice input, video input, or gestures.

Rather than processing the natural language commands 112 locally at the client device 104, the natural language module 110 communicates natural language data 114, representative of the natural language command 112, to the service provider system 102. In some cases, the natural data 114 includes the raw input data of the natural language command 112.

The service provider system 102 is depicted as including a natural language service 116 which is representative of functionality to generate executable code 118 for the client application 108 based on the received natural language data 114. The executable code 118 is then communicated back to the client device 104. The client application 108 then blindly executes the executable code 118 in order to perform the action identified by the natural language input.

Having considered an example environment, consider now a discussion of some example details of the techniques for remote generation of executable code for a client application based on natural language commands captured at a client device in accordance with one or more implementations.

Figure 2:
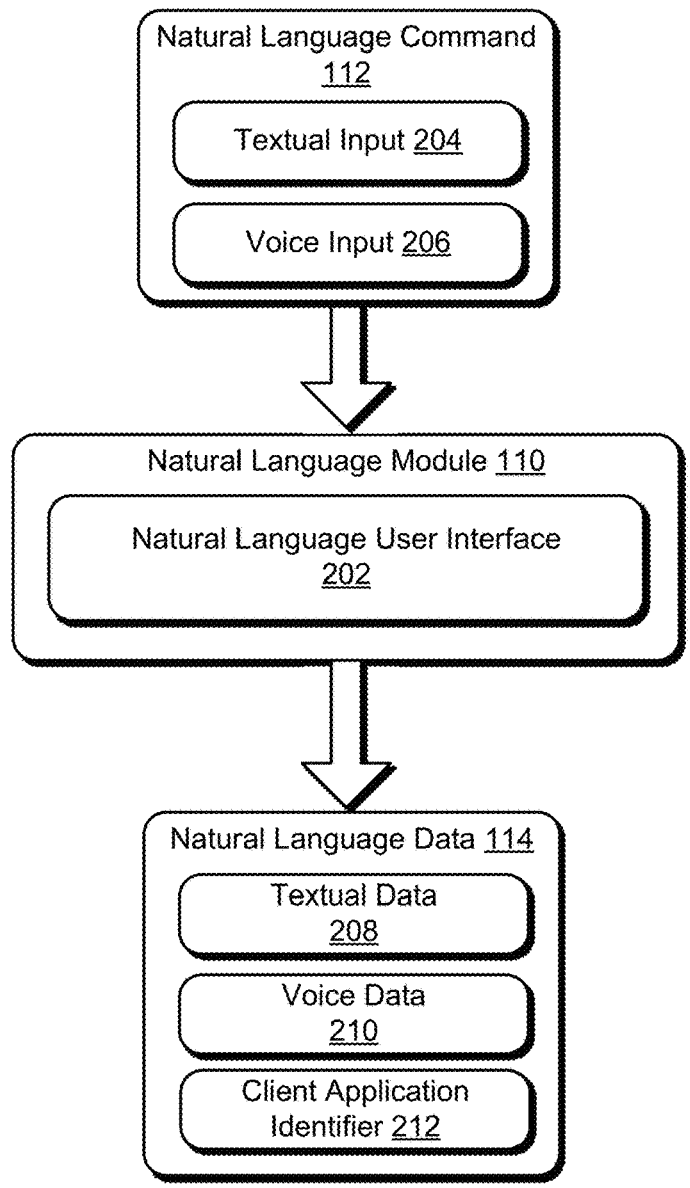
FIG. 2 depicts a system in an example implementation in which a natural language module generates natural language data based on a natural language command.

FIG. 2 depicts a system 200 in an example implementation in which the natural language module 110 generates natural language data 114 based on a natural language command 112.

In example 200, the natural language module 110 provides a natural language user interface 202. In some cases, the natural language user interface 202 is generated as digital content displayed within, or proximate, a user interface of the client application 108. The natural language module 110 is configured to receive natural language commands 112, via the natural language user interface 202. The natural language commands 112 may include textual input 204 and/or voice input 206. In some cases, the natural language user interface 202 includes a text-input control to receive textual input from the user (e.g., by typing using a keyboard). The natural language user interface 202 may also include a voice-input control which can be selected by the user to cause a microphone of the client device to listen for a voice command from the user.

In response to receiving the natural language command 112, the natural language module 110 generates natural language data 114. The natural language data 114 includes raw textual data 208 and/or raw voice data 210 which corresponds to the textual input 204 or the voice input 206, respectively. In this example, the natural language data 114 is further illustrated as including a client application identifier 212 which identifies the client application 108 associated with the natural language command 112. As discussed in more detail below, the natural language data 114 may also include content (e.g., image content, video content, or textual content) of the client application for which the natural language command 112 is intended. The natural language data 114 is communicated to the service provider system 102 via network 106. Notably, the natural language data 114 can be generated by the natural language module 110 without processing the natural language command 112 locally at the client device.

Figure 3:
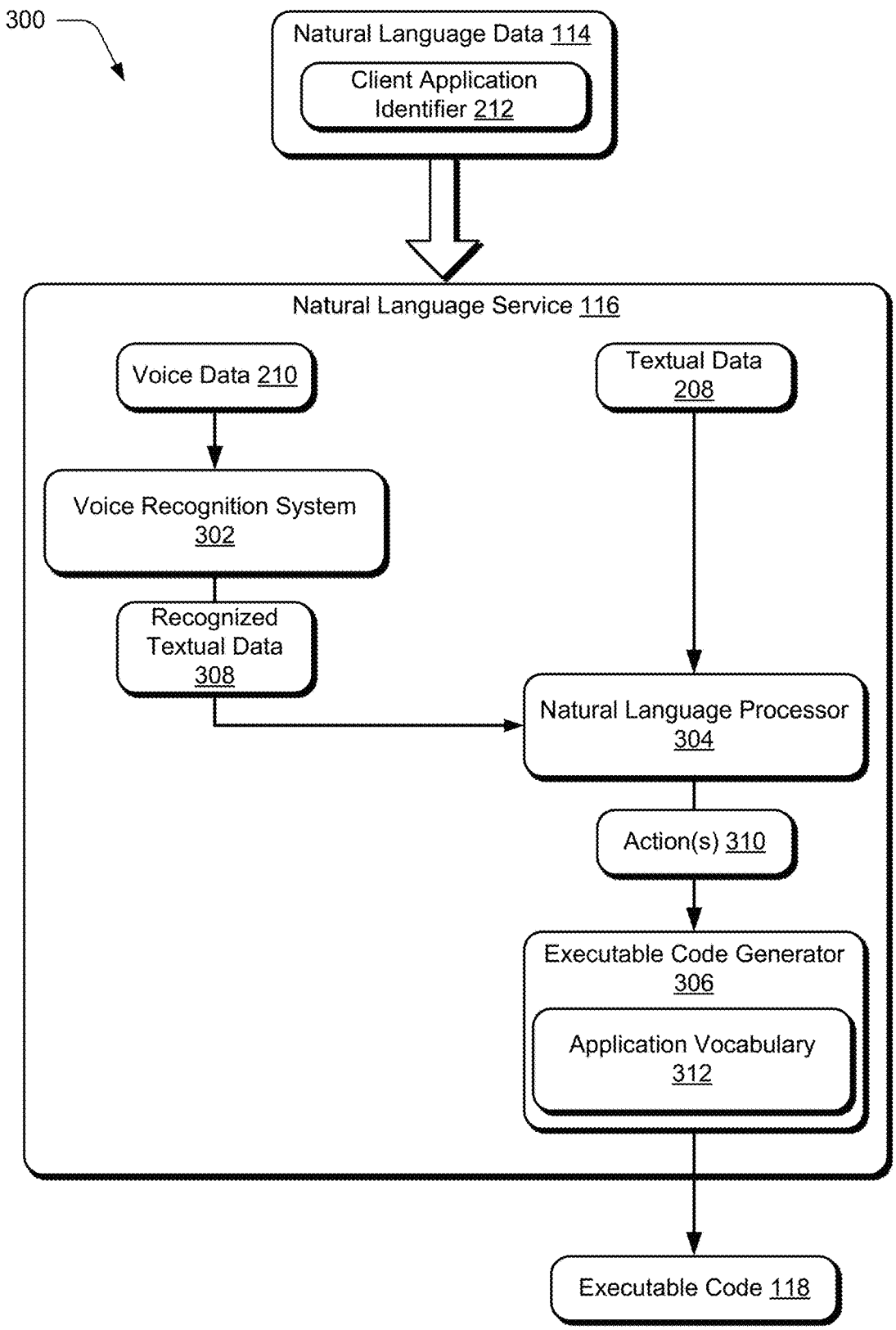
FIG. 3 depicts a system in an example implementation in which a natural language service generates executable code for a client application based on natural language data received from a client device.

FIG. 3 depicts a system 300 in an example implementation in which the natural language service 116 generates executable code 118 for a client application 108 based on natural language data 114 received from client device 104.

In example 300, the natural language service 116 is illustrated as including a voice recognition system 302, a natural language processor 304, and an executable code generator 306. In general, the voice recognition system 302 represents functionality to identify spoken words and phrases from a received audio signal (e.g., spoken into a microphone, recorded in an audio file, and so forth) and convert them into a computer-readable format (e.g., text) for interaction.

In example 300, the natural language service 116 receives, over network 106, the natural language data 114 generated by the natural language module 110 at client device 104. The natural language data 114 includes the raw natural language data of the received natural language command 112 and client application identifier 212 which identifies the corresponding client application 108 for which the natural language command 112 is intended.

Upon receiving the natural language data 114, the service provider system 102 determines whether the natural language data 114 includes textual data 208 or voice data 210. If the natural language data 114 includes voice data 210, then the voice data 210 is passed to voice recognition system 302. Voice recognition system 302 converts the voice data 210 into recognized textual data 308. For example, the voice recognition system 302 identifies spoken words and phrases in the voice data 210 and converts the spoken words and phrases into text.

Natural language processor 304 obtains the textual data 208 of the received natural language data 114 and/or the recognized textual data 308 generated by the voice recognition system 302 based on the voice data 210. The natural language processor 304 then processes the textual data, using one or more natural language processing techniques, to recognize one or more actions 310 of the natural language command 112.

The executable code generator 306 receives the recognized actions 310 of the natural language command 112. The executable code generator 306 may access various application vocabularies 312 for a wide range of different client applications, each of which may be stored at the service provider system. Each application vocabulary 312 maps various actions of the client application 108 to executable code (e.g., scripts) for executing the action which are understood by the client application 108. The executable code generator 306 selects an application vocabulary 312 based on the client application identifier 212 which identifies the client application 108. The executable code generator 306 then generates executable code 118 that is usable to perform the identified actions 310 by selecting the code and scripts in the selected application vocabulary 312 which are mapped to identified actions 310.

The natural language service 116 then communicates the executable code 118 back to the client device 104 for execution. The executable code 118 is configured to cause the client device to blindly execute the executable code 118 to perform the actions 310 of the natural language command 112. As discussed throughout, the executable code is configured to be understood by the client application 108 and can be blindly executed without performing any additional processing. In other words, the executable code generated by the natural language service 106 is executed by the client device without it being checked, parsed, or compiled for example.

Figure 4A:
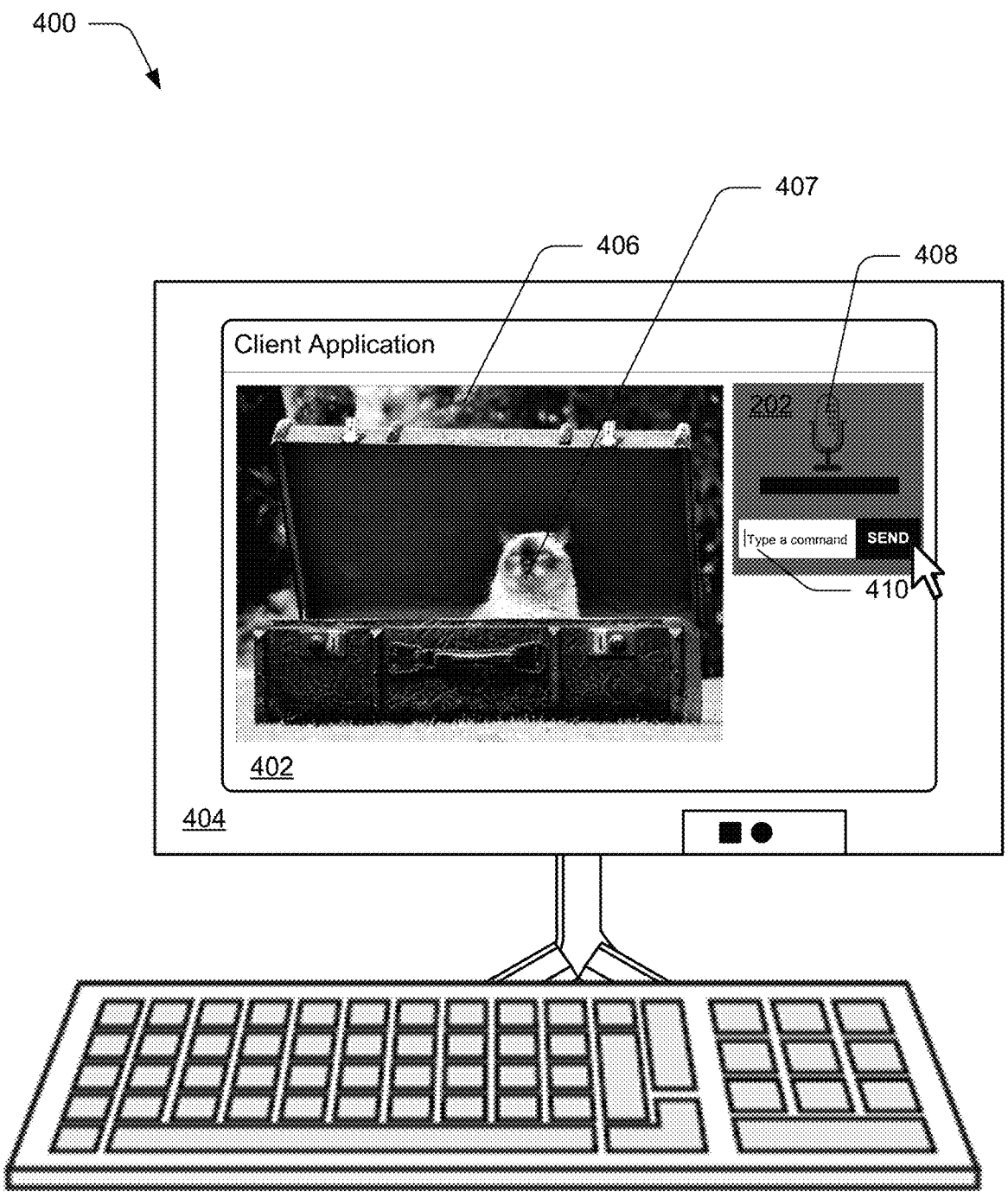
FIGS. 4A-4C illustrate an example of a text-based natural language command for a client application.
Figure 4B:
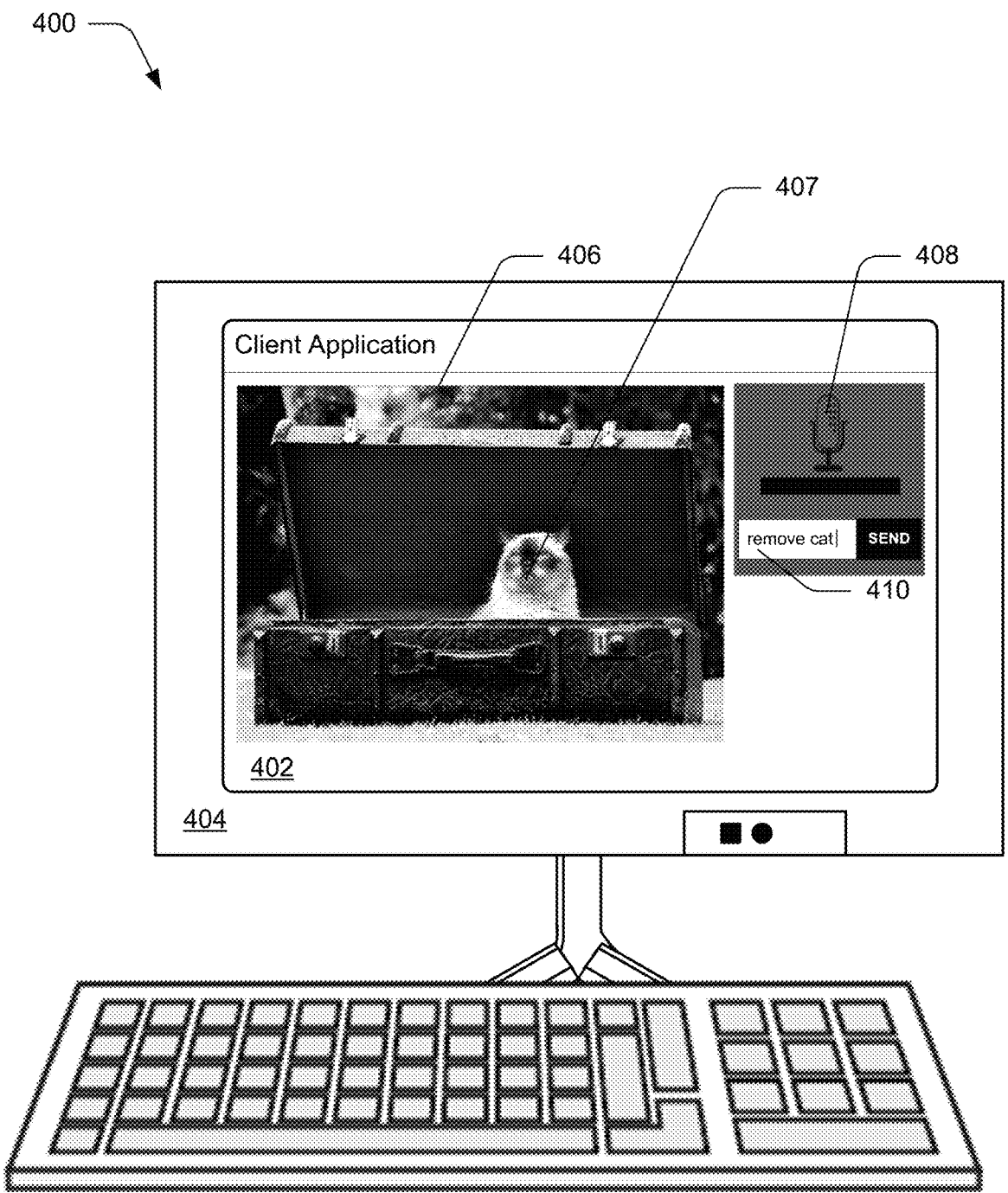
Figure 4C:
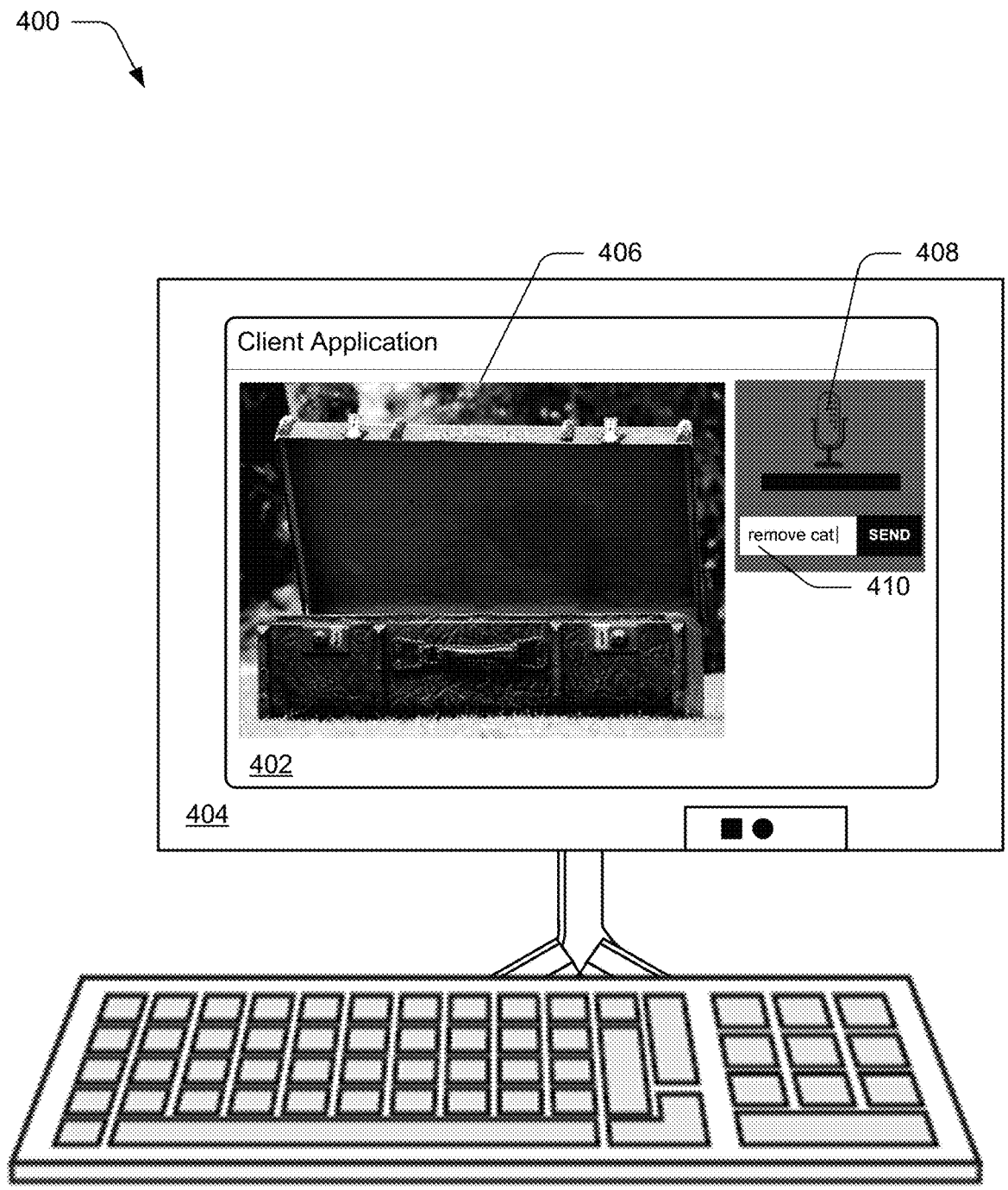

FIGS. 4A-4C illustrate an example 400 of a text-based natural language command for a client application. In particular, the illustrated example depicts a scenario in which a user interface 402 of a client application 108 is displayed via a display of device 404 depicted as a desktop computing device and display, which may correspond to client device 104. In the depicted scenario, the client application 108 corresponds to a content editing application. The client application 108 displays, within user interface 402, content 406 corresponding to an object 407 (a "cat") in a suitcase.

In this example, the natural language module 110 displays the natural language user interface 202 within the user interface 402 of the client application 108. However, the natural language user interface 202 could alternately be displayed separate from the user interface 402. The natural language user interface 202, in this example, includes a selectable voice-input control 408 and a text-input control 410. The inclusion of both selectable voice-input control 408 and text-input control 410 in natural language user interface 202 enables the user to provide a natural language command 112 in the form of either voice-based input or text-based input. The natural language user interface 202 also includes prompts for the user to select the selectable voice-input control 408 ("Press to Listen") and the text-input control 410 ("type a command"). Notably, the natural language user interface 202 could alternately be implemented with just one of the selectable voice-input control 408 or text-input control 410.

In FIG. 4B, the natural language module 110 receives a natural language command 112 to edit or manipulate the content 406 ("remove cat") as textual input through the text-based input control 410 of natural language user interface 202 displayed by natural language module 110. The user then selects a "send" control of the natural language user interface 202, which causes the natural language module 110 to generate natural language data 114 indicative of the textual input, and communicate the natural language data 114 to the service provider system 102 for processing. In this example, the natural language data includes the raw textual input "remove cat" and a client application identifier of the content editing application. In some cases, the natural language data 114 may also include a representation of the content 406.

As discussed throughout, a natural language service 116 of the service provider system 102 processes the natural language data 114 to generate executable code 118 (e.g., an executable script) to perform one or more identified actions 310 of the natural language command 112. For example, the natural language processor 304 processes the text "remove cat" using natural language processing techniques to recognize one or more actions to remove the cat 407 from the content 406 of the client application. The executable code generator 306 then generates the executable code to perform the "remove cat" actions by the identified client application. As described throughout, the executable code 118 is specifically configured for, and understood by, the client application 108. The executable code 118 is then communicated back to the natural language module 110 of client device 104 over network 106. The executable code is then blindly executed at the client device to perform the identified actions 310 of the natural language command. For example, in FIG. 4C, the natural language module 110 executes the executable code 118 at the client device 104 to cause the cat 407 to be removed from the displayed content 406 of the client application 108.

Figure 5A:
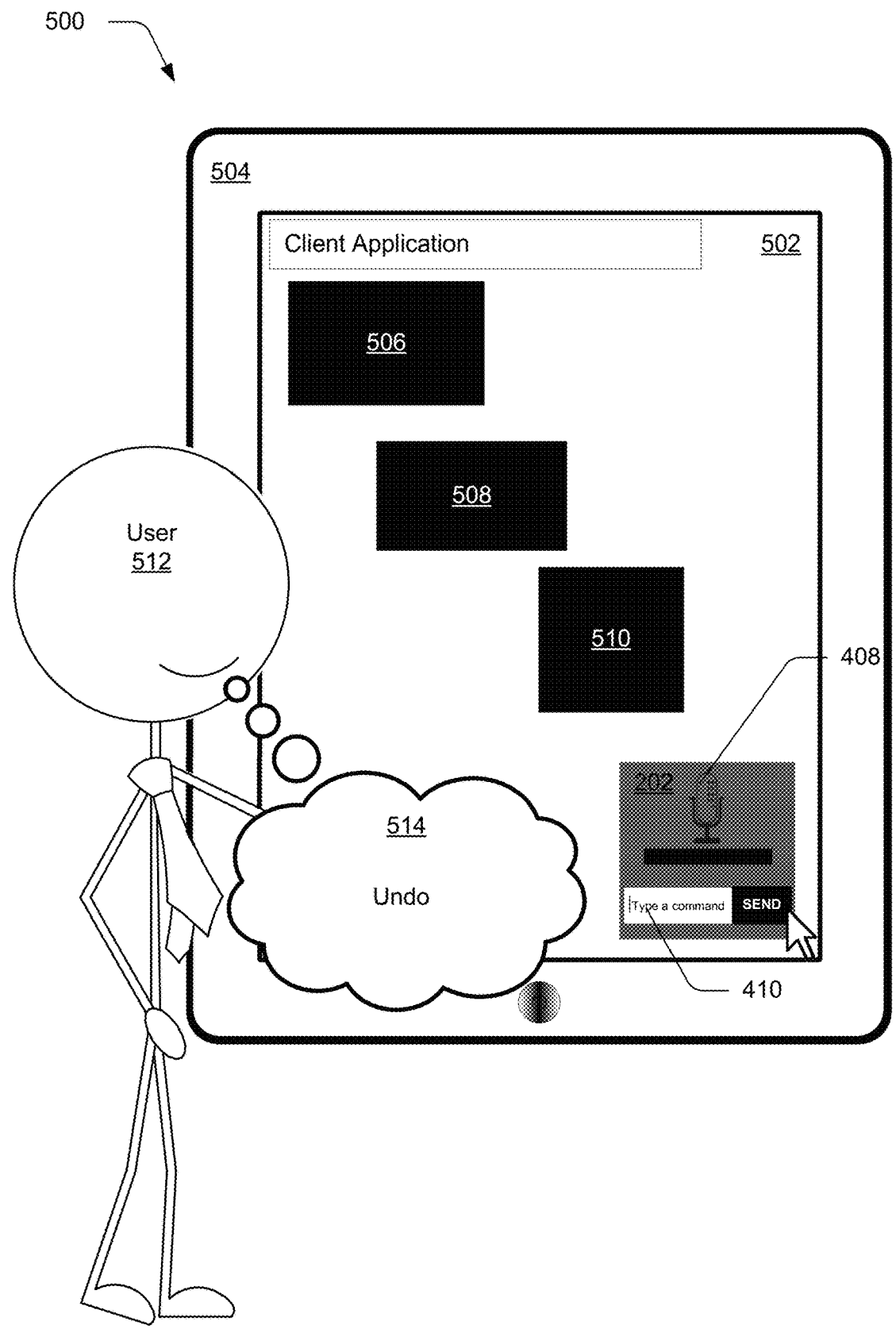
FIGS. 5A and 5B illustrate an example of a voice-based natural language command for a client application.
Figure 5B:
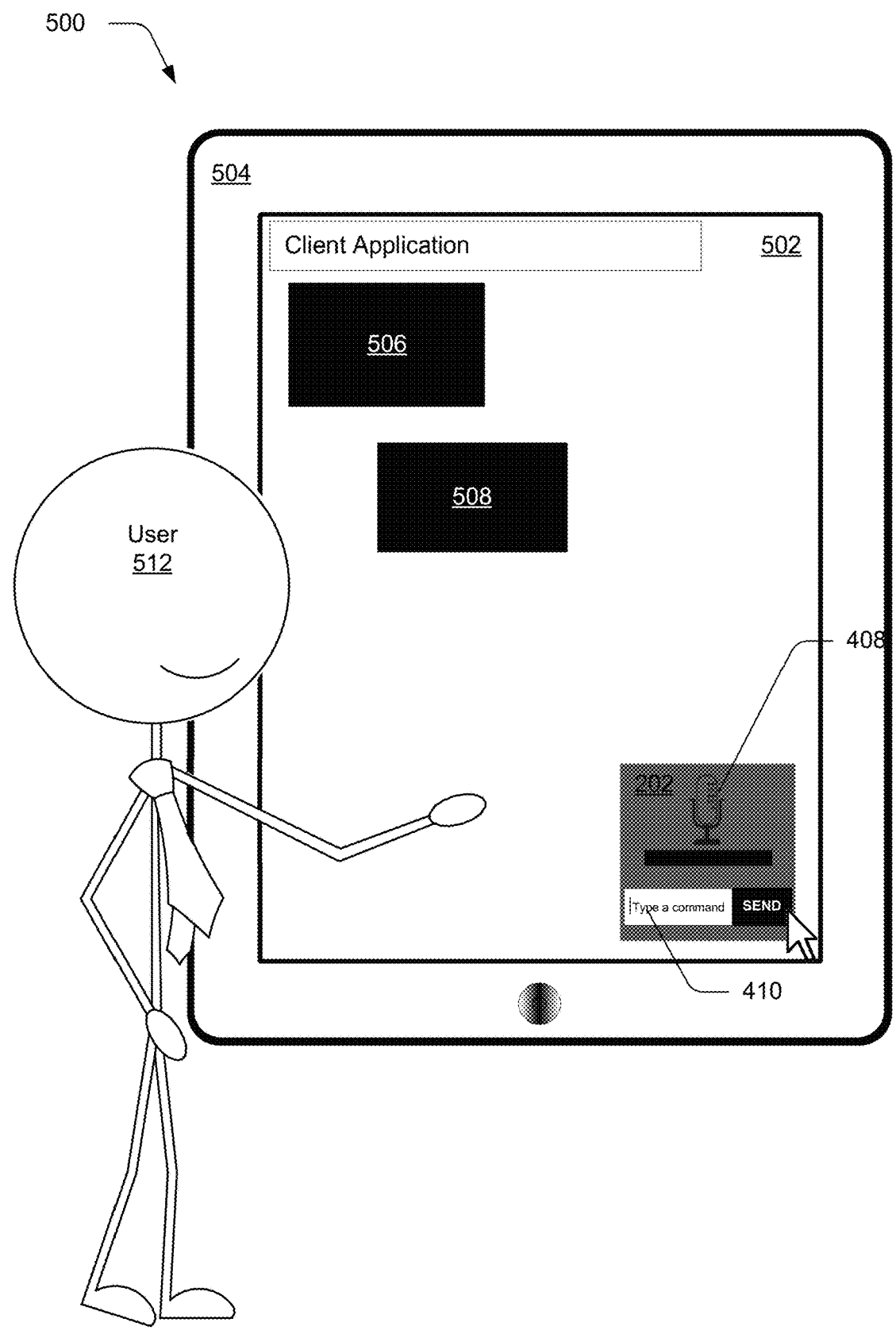

FIGS. 5A and 5B illustrate an example 500 of a voice-based natural language command for a client application. In particular, the illustrated example depicts a scenario in which a user interface 502 of a client application 108 is displayed via a display of device 504 depicted as a tablet computing device, which may correspond to client device 104. In the depicted scenario, the client application 108 corresponds to a content editing application, such as Photoshop or Illustrator by Adobe®. The client application 108 displays, within user interface 502, content which includes a first rectangle 506, a second rectangle 508, and a third rectangle 510. In this example, assume that the user first draws first rectangle 506, then draws second rectangle 508, and then draws third rectangle 510.

In this example, the natural language module 110 displays the natural language user interface 202 within the user interface 502 of the client application 108. However, the natural language user interface 202 could alternately be displayed separate from the user interface 502 of the client application. The natural language user interface 202, in this example, includes a selectable voice-input control 408 and a text-input control 410. The inclusion of both selectable voice-input control 408 and text-input control 410 in natural language user interface 202 enables the user to provide a natural language command 112 in the form of either voice input or textual input. The natural language user interface 202 includes prompts for the user to select the selectable voice control 408 ("Press to Listen") and the text-based input control 410 ("type a command"). Notably, the natural language user interface 202 could alternately be implemented with just one of the selectable voice-input control 408 and text-input control 410.

Unlike example 400 in which the user inputs a natural language command by typing text into the text-input control 410, in this instance a user 512 vocalizes a voice-based natural language command 512 ("undo") after selection of the selectable voice-input control 408 of the natural language user interface 202. In some cases, the voice-input control 408 could be selected by the user by speaking a "wake-up" word or phrase to cause the microphone to capture audio from the user. The voice-based natural language command 512 is recorded by a microphone of the client device and digitized into raw voice data 210. The user then selects a "send" control of the natural language user interface 202, which causes the natural language module 110 to generate natural language data 114 indicative of the voice-based natural language command 512, and communicate the natural language data 114 to the service provider system 102 for processing. Alternately, the natural language module 110 may communicate the natural language data 114 automatically—and without further user interaction—after recognizing the end of the voice-based natural language command 512. In this example, the natural language data includes the raw audio data "undo" and a client application identifier of the content editing application.

As discussed throughout, a natural language service 116 of the service provider system 102 processes the natural language data 114 to generate executable code 118 (e.g., an executable script) to perform one or more identified actions 310 of the natural language command 112. For example, the voice recognition system 302 processes the audio data to generate the text "undo". The text is then passed to the natural language processor 304 which maps the text "undo" to an undo action. The executable code generator 306 then generates the executable code to perform the "undo action" by the identified client application. As described throughout, the executable code 118 is specifically configured for, and understood by, the client application 108. The executable code 118 is then returned to the natural language module 110 of client device 104 over network 106. The natural language module 110 then blindly executes the executable code 118 to perform the identified actions 310 of the natural language command 112. For example, in FIG. 5B, the natural language module 110 executes the executable code 118 at the client device 104 to perform an undo action which causes the third rectangle 510 (which was drawn last by the user 512) to be removed from the displayed content.

In one or more implementations, the natural language data 114 may also include a representation of content (e.g., image content, video content, or textual content) of the client application 108 for which the natural language command 112 is intended. In this scenario, the natural language service 116 may be configured to generate the executable code 118 based at least in part on the content provided with the natural language data 114. As an example, in example 400 above, image data corresponding to content 406 depicting an image of cat 407 may be communicated to the natural language service 116. In this example, the natural language service 116 may include an object recognition module which is able to identify the image of the cat 407, and generate a position (e.g., x,y coordinates) of the cat 407 within the content 406. Then, the executable code can be generated to remove the image of the cat 407 from the content 406 based at least in part on the position of the cat determined at the natural language service 116.

Having discussed example details of the techniques for remote generation of executable code for a client application based on natural language commands captured at a client device, consider now some example procedures to illustrate additional aspects of the techniques.

Example Procedures

This section describes example procedures for remote generation of executable code for a client application based on natural language commands captured at a client device in one or more implementations. Aspects of the procedures may be implemented in hardware, firmware, or software, or a combination thereof. The procedures are shown as a set of blocks that specify operations performed by one or more devices and are not necessarily limited to the orders shown for performing the operations by the respective blocks.

Figure 6:
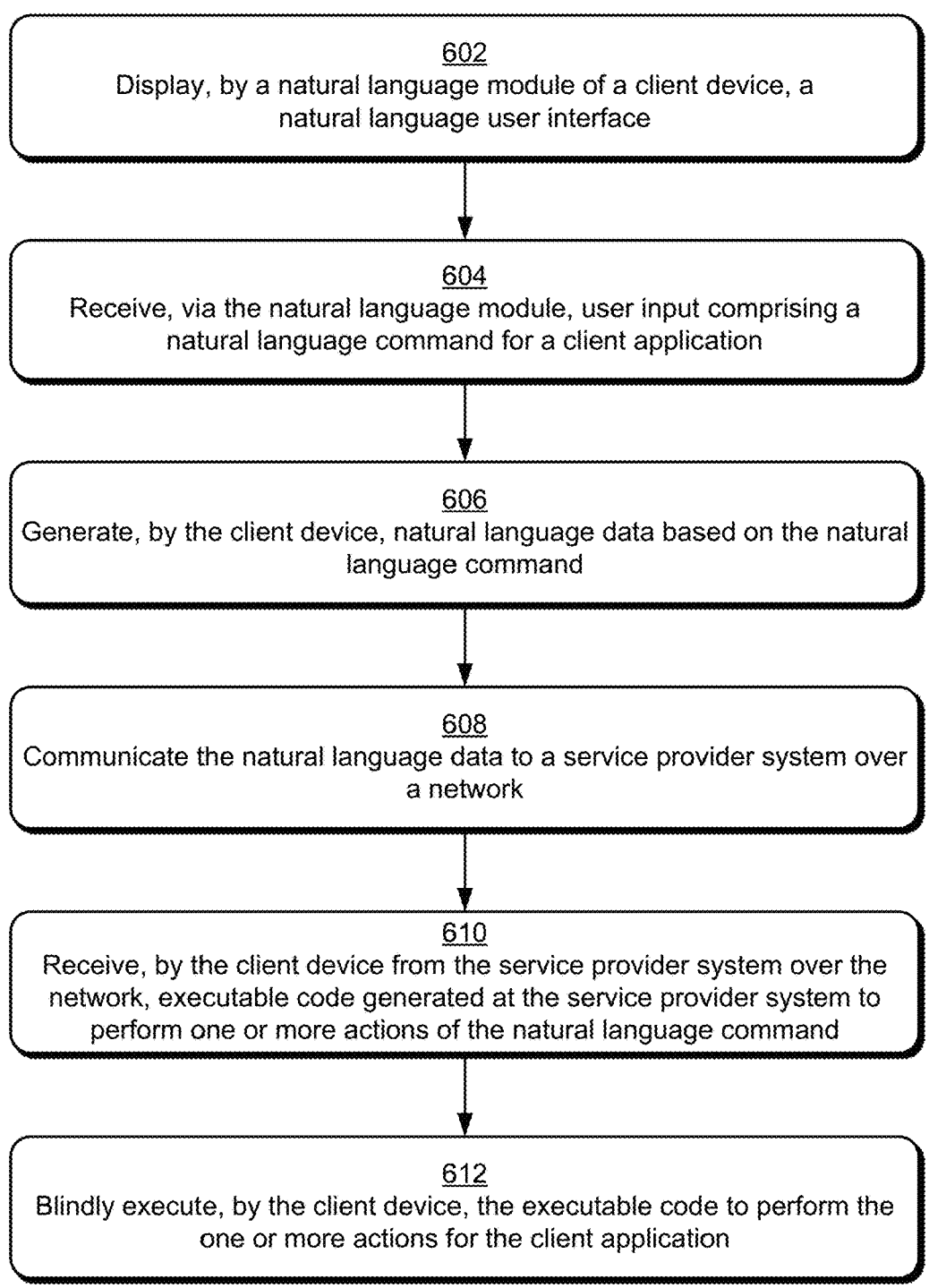
FIG. 6 depicts an example procedure in which a natural language module generates natural language data based on a natural language command and communicates the natural language data to a service provider system for processing.

FIG. 6 depicts an example procedure 600 in which a natural language module generates natural language data based on a natural language command and communicates the natural language data to a service provider system for processing.

A natural language user interface for a client application is displayed by a natural language module of a client device (block 602). For example, the natural language module 110 provides a natural language user interface 202. In some cases, the natural language user interface 202 is generated as digital content displayed within, or proximate, a user interface of the client application 108.

User input comprising a natural language command for a client application is received via the natural language module (block 604). For example, the natural language module 110 receives natural language commands 112 via the natural language user interface 202. The natural language commands 112 may include textual input 204 and/or voice input 206. In some cases, the natural language user interface 202 includes a text-input control (e.g., text-input control 410) to receive textual input from the user (e.g., by typing using a keyboard). The natural language user interface 202 may also include a voice-input control (e.g., voice input control 408) which can be selected by the user to cause a microphone of the client device to listen for a voice command from the user.

Natural language data is generated by the client device based on the natural language command (block 606), and the natural language data is communicated to a service provider system over a network (block 608). For example, in response to receiving the natural language command 112, the natural language module 110 generates natural language data 114. The natural language data 114 includes raw textual data 208 and/or raw voice data 210 which corresponds to the textual input 204 or the voice input 206, respectively. In some cases, the natural language data 114 may further include client application identifier 212 which identifies the client application 108 associated with the natural language command 112. The natural language data 114 is communicated to the service provider system 102 via network 106. Notably, the natural language data 114 can be generated by the natural language module 110 without processing the natural language command 112 locally at the client device.

Executable code generated at the service provider system to perform one or more actions of the natural language command is received by the client device from the service provider system over the network (block 610), and the executable code is blindly executed by the client device to perform the one or more actions for the client application (block 612). For example, the natural language service 116 communicates the executable code 118 back to the client device 104 for execution. The client device receives the executable code 118, and blindly executes the executable code 118 to perform the actions 310 of the natural language command 112. As discussed throughout, the executable code is configured to be understood by the client application 108 and can be blindly executing without performing any additional natural language processing.

Figure 7:
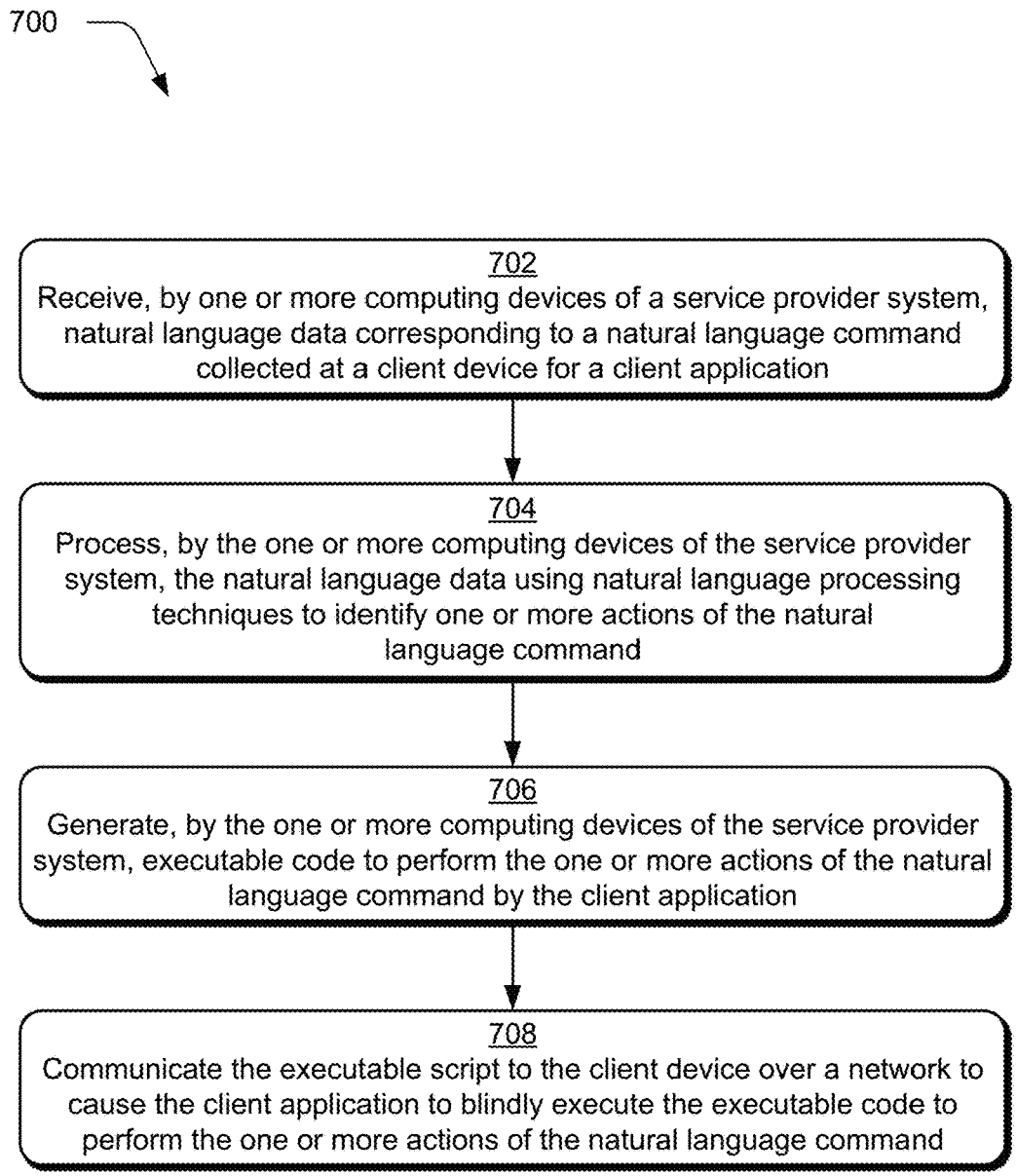
FIG. 7 depicts an example procedure in which a service provider system generates executable code for a client application at a client device based on natural language data collected at a client device.

FIG. 7 depicts an example procedure 700 in which a service provider system generates executable code for a client application at a client device based on natural language data collected at a client device.

Natural language data corresponding to a natural language command collected at a client device for a client application is received by one or more computing devices of a service provider system (block 702). For example, the natural language service 116 of service provider system 102 receives, over network 106, the natural language data 114 generated by the natural language module 110 at client device 104. The natural language data 114 includes the raw natural language data of the received natural language command 112 and client application identifier 212 which identifies the corresponding client application 108 for which the natural language command 112 is intended.

The natural language data is processed by the one or more computing devices of the service provider system to identify one or more actions of the natural language command (block 704). For example, upon receiving the natural language data 114, the service provider system 102 determines whether the natural language data 114 includes textual data 208 or voice data 210. If the natural language data 114 includes voice data 210, then the voice data 210 is passed to voice recognition system 302. Voice recognition system 302 converts the voice data 210 into recognized textual data 308. For example, the voice recognition system 302 identifies spoken words and phrases in the voice data 210 and converts the spoken words and phrases into text. Next, the natural language processor 304 obtains the textual data 208 of the received natural language data 114 and/or the recognized textual data 308 generated by the voice recognition system 302 based on the voice data 210. The natural language processor 304 then processes the textual data, using one or more natural language processing techniques, to recognize one or more actions 310 of the natural language command 112.

Executable script is generated by the one or more computing devices of the service provider system to perform the one or more actions of the natural language command by the client application (block 706). For example, the executable code generator 306 receives the recognized actions 310 of the natural language command 112. The executable code generator 306 may access various application vocabularies 312 for a wide range of different client applications, each of which may be stored at the service provider system. Each application vocabulary 312 maps various actions of the client application 108 to executable code (e.g., scripts) for executing the action which are understood by the client application 108. The executable code generator 306 selects an application vocabulary 312 based on the client application identifier 212 which identifies the client application 108. The executable code generator 306 then generates executable code 118 that is usable to perform the identified actions 310 by selecting the code and scripts in the selected application vocabulary 312 which are mapped to identified actions 310.

The executable script is communicated to the client device over a network to cause the client application to blindly execute the executable script to perform the one or more actions of the natural language command (block 708). For example, the natural language service 116 of the service provider system 102 communicates the executable code 118 back to the client device 104 for execution. The executable code 118 is configured to cause the client device to blindly execute the executable code 312 to perform the actions 310 of the natural language command 112. As discussed throughout, the executable code is configured to be understood by the client application 108 and can be blindly executing without performing any additional natural language processing.

Having described example procedures in accordance with one or more implementations, consider now an example system and device that can be utilized to implement the various techniques described herein.

Example System and Device

Figure 8:
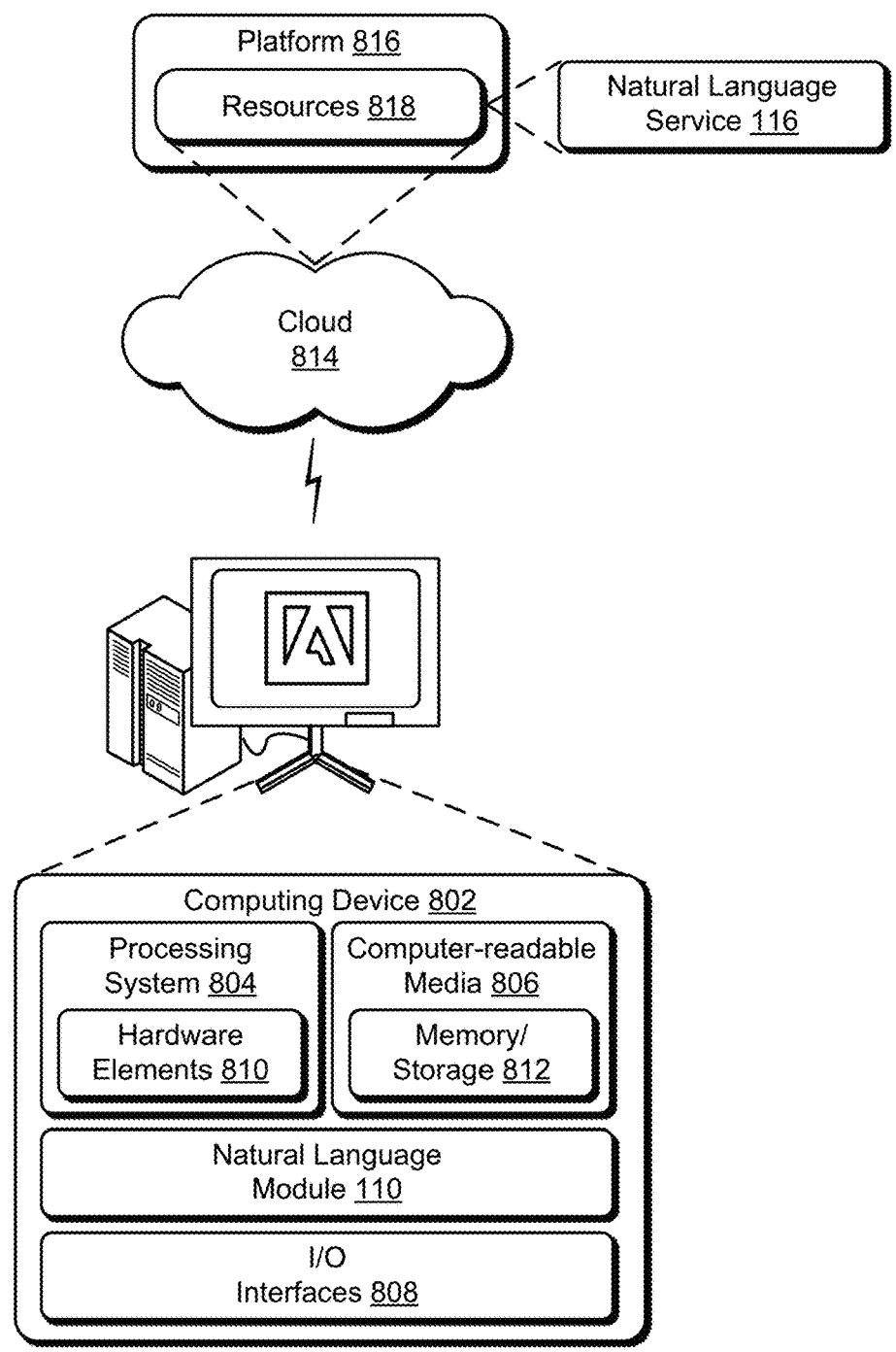
FIG. 8 illustrates an example system generally at 800 that includes an example computing device 802 that is representative of one or more computing systems and/or devices that may implement the various techniques described herein.

FIG. 8 illustrates an example system generally at 800 that includes an example computing device 802 that is representative of one or more computing systems and/or devices that may implement the various techniques described herein. This is illustrated through inclusion of the natural language module 110 and the natural language service 116. The computing device 802 may be, for example, a server of a service provider, a device associated with a client (e.g., a client device), an on-chip system, and/or any other suitable computing device or computing system.

The example computing device 802 as illustrated includes a processing system 804, one or more computer-readable media 806, and one or more I/O interfaces 808 that are communicatively coupled, one to another. Although not shown, the computing device 802 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 804 is representative of functionality to perform one or more operations using hardware. Accordingly, the processing system 804 is illustrated as including hardware elements 810 that may be configured as processors, functional blocks, and so forth. This may include implementation in hardware as an application specific integrated circuit or other logic device formed using one or more semiconductors. The hardware elements 810 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 806 is illustrated as including memory/storage 812. The memory/storage 812 represents memory/storage capacity associated with one or more computer-readable media. The memory/storage component 812 may include volatile media (such as random access memory (RAM)) and/or nonvolatile media (such as read only memory (ROM), Flash memory, optical disks, magnetic disks, and so forth). The memory/storage component 812 may include fixed media (e.g., RAM, ROM, a fixed hard drive, and so on) as well as removable media (e.g., Flash memory, a removable hard drive, an optical disc, and so forth). The computer-readable media 806 may be configured in a variety of other ways as further described below.

Input/output interface(s) 808 are representative of functionality to allow a user to enter commands and information to computing device 802, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 802 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 802. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media.

The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 802, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 810 and computer-readable media 806 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 810. The computing device 802 may be configured to implement particular instructions and/or functions corresponding to the software and/or hardware modules. Accordingly, implementation of a module that is executable by the computing device 802 as software may be achieved at least partially in hardware, e.g., through use of computer-readable storage media and/or hardware elements 810 of the processing system 804. The instructions and/or functions may be executable/operable by one or more articles of manufacture (for example, one or more computing devices 802 and/or processing systems 804) to implement techniques, modules, and examples described herein.

The techniques described herein may be supported by various configurations of the computing device 802 and are not limited to the specific examples of the techniques described herein. This functionality may also be implemented all or in part through use of a distributed system, such as over a "cloud" 814 via a platform 816 as described below.

The cloud 814 includes and/or is representative of a platform 816 for resources 818. The platform 816 abstracts underlying functionality of hardware (e.g., servers) and software resources of the cloud 814. The resources 818 may include applications and/or data that can be utilized while computer processing is executed on servers that are remote from the computing device 802. Resources 818 can also include services provided over the Internet and/or through a subscriber network, such as a cellular or Wi-Fi network.

The platform 816 may abstract resources and functions to connect the computing device 802 with other computing devices. The platform 816 may also serve to abstract scaling of resources to provide a corresponding level of scale to encountered demand for the resources 818 that are implemented via the platform 816. Accordingly, in an interconnected device embodiment, implementation of functionality described herein may be distributed throughout the system 800. For example, the functionality may be implemented in part on the computing device 802 as well as via the platform 816 that abstracts the functionality of the cloud 814.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. In a digital medium environment, a method implemented by a client device, the method comprising:
    displaying, by a natural language module of the client device, a natural language user interface;
    receiving, by the natural language module, user input comprising a natural language command that instructs a client application to perform an action;
    generating, by the natural language module of the client device, natural language data based on the natural language command;
    communicating the natural language data to a service provider system over a network;
    receiving, by the client device from the service provider system over the network, executable script generated at the service provider system using the natural language data, the executable script configured to cause the client application to perform the action of the natural language command, the executable script configured by the service provider system for blind execution by the client application; and
    blindly executing, by the client device, the executable script received from the service provider system to perform the action of the natural language command, the blindly executing the executable script received from the service provider system causing the action of the natural language command to be performed by the client application without any additional processing of the executable script at the client device.

2. The method as described in claim 1, wherein the natural language data is generated without performing natural language processing locally at the client device, and wherein the natural language data comprises raw voice data captured by one or more microphones of the client device in response to a user selection of a voice-input control of the natural language user interface.

3. The method as described in claim 1, wherein the blindly executing further comprises causing the action of the natural language command to be performed by the client application without any additional processing of the executable script at the client device and without receiving any additional user input.

4. The method as described in claim 1, wherein the natural language user interface includes a text-input control and the natural language data includes raw textual data comprising text entered into the text-input control of the natural language user interface.

5. The method as described in claim 1, wherein the natural language user interface includes a voice-input control and the natural language data comprises raw voice data captured by one or more microphones of the client device in response to a user selection of the voice-input control of the natural language user interface.

6. The method as described in claim 5, wherein the natural language data communicated to the service provider system further includes an identifier of the client application.

7. The method as described in claim 6, wherein the identifier of the client application causes the service provider system to generate the executable script that is understandable by the client application.

8. The method as described in claim 1, wherein the natural language module comprises an extension installed for the client application, and wherein the natural language module is configured to interface with multiple different client applications.

9. The method as described in claim 1, wherein the natural language data further includes content of the client application.

10. The method as described in claim 1, wherein the natural language data communicated to the service provider system includes raw data of the natural language command and an identifier of the client application.

11. A method implemented by one or more computing devices of a service provider system, the method comprising:
receiving, by the one or more computing devices of the service provider system, natural language data corresponding to a natural language command collected at a client device for a client application, the natural language command instructing the client application to perform one or more actions;
processing, by the one or more computing devices of the service provider system, the natural language data using natural language processing techniques to recognize the one or more actions of the natural language command;
generating, by the one or more computing devices of the service provider system, executable script to perform the one or more actions of the natural language command by the client application, the executable script configured for the client application; and
communicating the executable script to the client device over a network to cause the client application to execute the executable script to perform the one or more actions of the natural language command without any additional processing of the executable script at the client device.

12. The method as described in claim 11, wherein the natural language data includes textual data comprising raw text collected at the client device.

13. The method as described in claim 12, wherein the process further comprises processing the textual data using the natural language processing techniques to recognize the one or more actions of the natural language command.

14. The method as described in claim 11, wherein the natural language data includes voice data comprising raw voice data collected at the client device via one or more microphones of the client device.

15. The method as described in claim 11, wherein the generating the executable script further comprises:
selecting an application vocabulary associated with the client application; and
generating the executable script by selecting the executable script from the application vocabulary that is mapped to the one or more actions.

16. The method as described in claim 15, wherein selection of the application vocabulary is based on a client application identifier included with the natural language data.

17. The method as described in claim 11, wherein the natural language data further includes a representation of content of the client application, and wherein the executable script is generated based at least in part on the representation of the content.

18. A service provider system comprising:
at least a memory and a processor to implement a natural language service, the natural language service configured to perform operations comprising:
receiving, over a network, voice data corresponding to a natural language command collected at a client device for a client application, the natural language command instructing the client application to perform one or more actions;
converting, by a voice recognition system of the natural language service, the voice data into recognized textual data;
processing, by a natural language processor of the natural language service, the recognized textual data to identify the one or more actions of the recognized textual data;
generating executable script to perform the one or more actions of the natural language command by the client application, the executable script configured for the client application; and
communicating the executable script to the client device over the network to cause the client application to blindly execute the executable script to perform the one or more actions of the natural language command without any additional processing of the executable script at the client device.

19. The service provider system of claim 18, wherein the communicating causes the client application to blindly execute the executable script without any additional processing of the executable script at the client device and without receiving any additional user input.

20. The service provider system of claim 18, wherein the generating the executable script further comprises:
selecting an application vocabulary associated with the client application; and
generating the executable script by selecting the executable script from the application vocabulary that is mapped to the one or more identified actions.

* * * * *